(12) United States Patent
Jeanneteau et al.

(10) Patent No.: US 10,813,178 B2
(45) Date of Patent: Oct. 20, 2020

(54) INDUCTION COIL FOR AN INDUCTION HEATING APPLIANCE

(71) Applicant: ELECTROLUX APPLIANCES AKTIEBOLAG, Stockholm (SE)

(72) Inventors: Laurent Jeanneteau, Forli (IT); Filippo Milanesi, Forli (IT); Alex Viroli, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 16/343,490

(22) PCT Filed: Oct. 25, 2016

(86) PCT No.: PCT/EP2016/075709
§ 371 (c)(1),
(2) Date: Apr. 19, 2019

(87) PCT Pub. No.: WO2018/077393
PCT Pub. Date: May 3, 2018

(65) Prior Publication Data
US 2019/0335549 A1    Oct. 31, 2019

(51) Int. Cl.
*H05B 6/12* (2006.01)
*H05B 6/36* (2006.01)

(52) U.S. Cl.
CPC ......... *H05B 6/1272* (2013.01); *H05B 6/1254* (2013.01)

(58) Field of Classification Search
CPC ...... H05B 6/062; H05B 6/065; H05B 6/1209; H05B 6/1245; H05B 6/1254;
(Continued)

(56) References Cited

U.S. PATENT DOCUMENTS

| | | | | |
|---|---|---|---|---|
| 4,792,652 A | * | 12/1988 | Seguy | H05B 6/065 219/624 |
| 2010/0206871 A1 | * | 8/2010 | Kataoka | H05B 6/062 219/622 |

FOREIGN PATENT DOCUMENTS

| | | |
|---|---|---|
| CN | 102348299 A | 2/2012 |
| CN | 102387621 A | 3/2012 |

(Continued)

OTHER PUBLICATIONS

International Search Report and Written Opinion in PCT/EP2016/075709 dated Jul. 12, 2017, 9 pages.
(Continued)

*Primary Examiner* — Hung D Nguyen
(74) *Attorney, Agent, or Firm* — Pearne & Gordon LLP (57) ABSTRACT

An induction coil for an induction heating appliance is disclosed. The induction coil includes at least one base plate and at least one winding arrangement. The winding arrangement includes at least one portion of high winding concentration and at least one portion of low winding concentration. The winding arrangement includes at least two coils. The base plate is arranged above one or more winding arrangements. The base plate includes at least one conductive portion and at least one non-conductive portion. At least one conductive portion of the base plate is arranged above at least one portion of high winding concentration of the winding arrangement. At least one non-conductive portion of the base plate is arranged above at least one portion of low winding concentration of the winding arrangement.

20 Claims, 6 Drawing Sheets

(58) Field of Classification Search
CPC .. H05B 6/1263; H05B 6/1272; H05B 6/1281; H05B 6/36; H05B 6/362; H05B 6/365
USPC ....... 219/620, 622, 624, 662, 670, 671, 672, 219/674, 675, 676
See application file for complete search history.

(56) References Cited

FOREIGN PATENT DOCUMENTS

| | | |
|---|---|---|
| CN | 103392377 A | 11/2013 |
| EP | 1858300 A1 | 11/2007 |
| EP | 2207401 B1 | 2/2012 |
| EP | 2434836 B1 | 3/2012 |
| EP | 2925088 A1 | 9/2015 |
| EP | 3091818 A1 | 11/2016 |
| WO | 2014026878 A1 | 2/2014 |

OTHER PUBLICATIONS

Office action issued in counterpart Chinese Application 201680023311.7 dated Apr. 17, 2020 (with translation), 13 pages.

\* cited by examiner

INDUCTION COIL FOR AN INDUCTION HEATING APPLIANCE

The present invention relates to an induction coil for an induction heating appliance, in particular for an induction cooking hob. Further, the present invention relates to an induction heating appliance. Moreover, the present invention relates to an induction cooking hob.

An induction coil is provided for heating up ferromagnetic matter by eddy currents. In particular, the bottom of a cooking pot is made of ferromagnetic matter and heated up by the induction coil. The winding arrangement of the induction coil may have different shapes in order to satisfy geometric conditions.

Some special shapes of the winding arrangement of the induction coil result in portions with higher and lower winding concentrations. For example, if the ground area of the winding arrangement of the induction coil comprises one or more acute angles, the low winding concentrations occur in the portion of said acute angles. Different winding concentrations result in a non-uniform heat distribution in the ferromagnetic matter.

It is an object of the present invention to provide an induction coil having a winding arrangement with different winding concentrations, wherein said induction coil allows a uniform heat distribution.

The present invention provides an induction coil for an induction heating appliance, in particular for an induction cooking hob, wherein:
- the induction coil comprises at least one base plate and at least one winding arrangement,
- the winding arrangement includes at least one portion of high winding concentration and at least one portion of low winding concentration,
- the winding arrangement includes at least two coils, preferably at least three coils,
- the base plate is arranged above one or more winding arrangements,
- the base plate includes at least one conductive portion and at least one non-conductive portion,
- at least one conductive portion of the base plate is arranged above at least one portion of high winding concentration of the winding arrangement,
- at least one non-conductive portion of the base plate is arranged above at least one portion of low winding concentration of the winding arrangement,
- the conductive portion of the base plate is made by at least one conductive material, and
- the non-conductive portion of the base plate is made by at least one non-conductive material and/or formed by at least one cut-out in the base plate.

The core of the present invention is that the non-conductive portion of the base plate is arranged above a portion of low winding concentration of the winding arrangement, while the conductive portion of the base plate is made by at least one conductive material. The conductive portion of the base plate reacts locally to the magnetic field generated by the portion of high winding concentration of the winding arrangement, so that the coupling between the magnetic field and matter being heated by said magnetic field is reduced. In contrast, the non-conductive portion of the base plate does not react to the magnetic field generated by the portion of low winding concentration of the winding arrangement, so that the coupling between the magnetic field and the matter being heated by said magnetic field remains unchanged. This results in a uniform heat distribution in the matter being heated by the magnetic field. Since the winding arrangement is composed of coils, a plurality of different winding arrangements may be assembled by a low number of types of said coils.

Preferably, the base plate covers one winding arrangement or more adjacent winding arrangements.

According to a preferred embodiment of the present invention the ground area of the winding arrangement includes at least one acute angle. In the portion of the acute angle only low winding concentration of the winding arrangement is possible.

In particular, the ground area of the winding arrangement has a triangular shape including two or three acute angles. Preferably, the winding arrangement includes at least three coils.

Further, the triangular ground area of the winding arrangement may include one right angle. In the portion of the right angle the high winding concentration of the winding arrangement is possible, since the coil requires less space in the right angle than in the acute angle.

For example, the induction coil comprises at least one pair of winding arrangements including one right angle, wherein said pair of winding arrangements comprises a square or rectangular ground area.

In this case, the pair of winding arrangements is covered by one square or rectangular base plate.

Moreover, a plurality of pairs of winding arrangements may be arranged in a row or as a matrix.

For example, the coils are circular, elliptic, triangular, square, and/or rectangular. In general, the coils may have an arbitrary shape.

According to one aspect of the present invention, the coils of one winding arrangement are identical, wherein the at least one portion of high winding concentration and the at least one portion of low winding concentration of the winding arrangement are formed by the positions of the coils. The use of only one type of coils allows the production of the winding arrangement by low complexity.

According to another aspect of the present invention, at least two coils of one winding arrangement are different, wherein the at least one portion of high winding concentration and the at least one portion of low winding concentration of the winding arrangement are formed by the positions and the properties of the coils. The use of several different types of coils allows a plurality of combinations of the portions of high winding concentrations and the portions of low high winding concentrations on the winding arrangement.

In particular the coils of one winding arrangement can be connected together either by series or parallel electrical connections. In a preferred embodiment at least two, preferably all, of the coils of one winding arrangement are connected together by series electrical connections. In an equally preferred embodiment at least two, preferably all, of the coils of one winding arrangement are connected together by parallel electrical connections.

In particular, the conductive material of the base plate includes metal, preferably aluminium.

Further, the non-conductive material of the base plate may include mica.

For example, the base plate is made of a mica sheet, wherein the conductive portion of said base plate is formed by conductive windings made of litz wire and deposited on said mica sheet.

According to another embodiment the base plate is made of metal, preferably aluminium, and the non-conductive portion is formed by a plurality of cut-outs in said base plate.

Preferably, the non-conductive portion is formed by a plurality of slots and/or holes.

Furthermore, the base plate may include a plurality of ferrite elements, wherein the concentration of said ferrite elements in the non-conductive portion is higher than in the conductive portion. The ferrite elements increase the coupling between the magnetic field and the matter being heated by said magnetic field.

At last, the present invention relates to an induction heating appliance, in particular an induction cooking hob, comprising at least one induction coil mentioned above.

Novel and inventive features of the present invention are set forth in the appended claims.

The present invention will be described in further detail with reference to the drawing, in which

Figure 1:
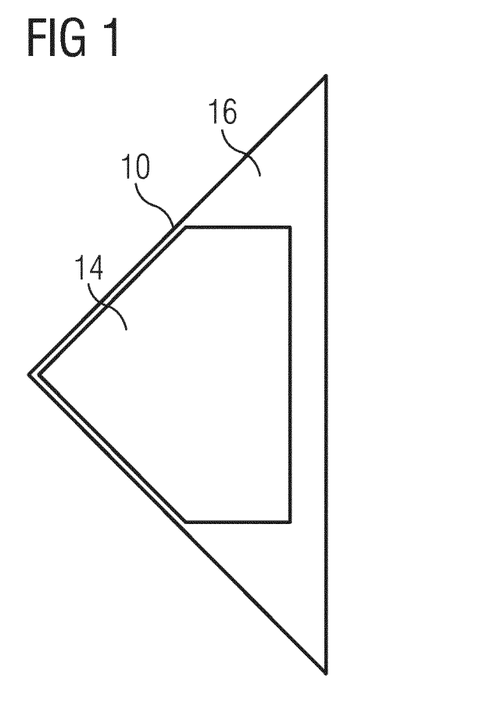
FIG. 1 illustrates a schematic top view of a base plate for the induction coil according to a first embodiment of the present invention.

FIG. 1 illustrates a schematic top view of a base plate 10 for the induction coil according to a first embodiment of the present invention. The induction coil is provided for an induction heating appliance, in particular for an induction cooking hob.

In this example, the ground area of the base plate 10 is triangular and includes one right angle and two acute angles. The triangular base plate 10 may be equilateral. In general, the ground area of the base plate 10 may have an arbitrary shape, but at least one acute angle.

The base plate 10 includes a conductive portion 14 and a non-conductive portion 16. The conductive portion 14 extends over the environment of the right angle. The non-conductive portion 16 extends over the environments of the acute angles. The conductive portion 14 is made of at least one conductive material, while the non-conductive portion 16 is made of at least one dielectric material. For example, the conductive portion 14 is made of aluminium and the non-conductive portion 16 is made of mica.

Figure 2:
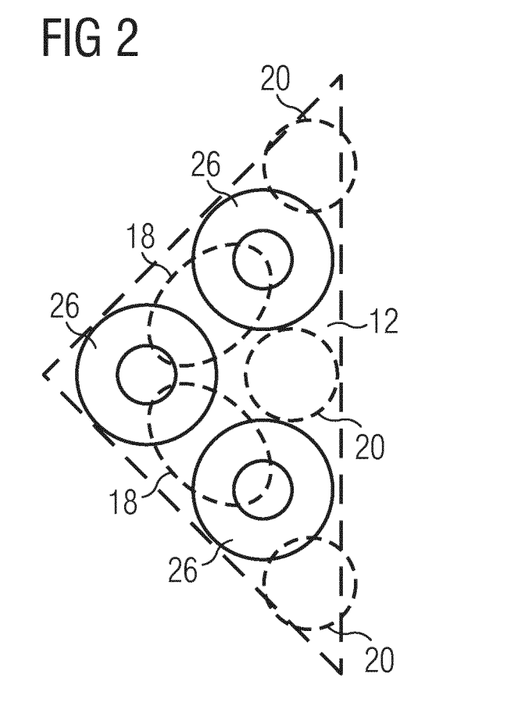
FIG. 2 illustrates a schematic top view of a winding arrangement for the induction coil according to a preferred embodiment of the present invention.

FIG. 2 illustrates a schematic top view of a winding arrangement 12 for the induction coil according to a preferred embodiment of the present invention.

The winding arrangement 12 has substantially the same ground area as the base plate 10 in FIG. 1. The winding arrangement 12 is triangular and includes one right angle and two acute angles. In this example, the winding arrangement 12 includes three coils 26, wherein each coil 26 is arranged within one angle of said winding arrangement 12. In this embodiment, the three coils 26 are circular, have the same sizes and are constructed in the same way. The use of only one type of coils 26 allows the production of the winding arrangement by low complexity. The winding arrangement 12 includes two portions of high winding concentration 18 in the environment of the right angle. Each portion of high winding concentration 18 is formed by the small distance between the coil 26 in the right angle and one of the coils 26 in the acute angle. Further, the winding arrangement 12 includes three portions of low winding concentration 20 in the environments of the both acute angles and between the coils 26 in said acute angles. The winding concentration depends on the positions of the coils 26. In turn, the possible positions of the coils 26 depend on the angles of the winding arrangement 12. Although the three circular coils 26 are identical, the portions of high winding concentration 18 and low winding concentration 20 occur on the winding arrangement 12. In general, the arrangement of the coils 26 defines the spatial distribution of the portions of high winding concentrations 18 and low winding concentrations 20 upon the winding arrangement 12.

Within the induction coil the base plate 10 of FIG. 1 is congruent with the winding arrangement 12 of FIG. 2. If the induction coil is a part of an induction cooking hob, then the base plate 10 of FIG. 1 is arranged above and covers the winding arrangement 12 of FIG. 2. Thereby, the conductive portion 14 of the base plate 10 covers the portion of high winding concentration 18 of the winding arrangement 12. In a similar way, the non-conductive portion 16 of the base plate 10 covers the portions of low winding concentration 20 of the winding arrangement 12.

The conductive portion 14 of the base plate 10 reacts locally to the magnetic field generated by the portion of high winding concentration 18 of the winding arrangement 12, so that the coupling between the magnetic field and matter being heated by said magnetic field is reduced. In contrast, the non-conductive portions 16 of the base plate 10 do not react to the magnetic field generated by the portion of low winding concentration 20 of the winding arrangement 12, so that the coupling between the magnetic field and the matter being heated by said magnetic field remains unchanged. This allows a uniform heat distribution. For example, the matter being heated by the magnetic field is the bottom of a cooking pot.

Figure 3:
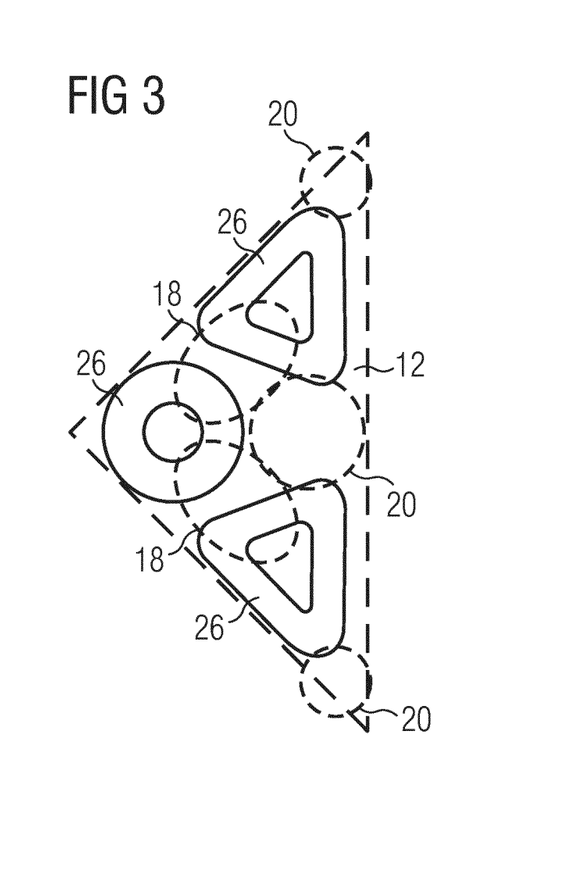
FIG. 3 illustrates a schematic top view of a winding arrangement for the induction coil according to a further embodiment of the present invention.

FIG. 3 illustrates a schematic top view of a winding arrangement 12 for the induction coil according to a further embodiment of the present invention.

The winding arrangement 12 has substantially the same ground area as the base plate 10 in FIG. 1 and as the winding arrangement 12 in FIG. 2. Thus, the winding arrangement 12 is also triangular and includes one right angle and two acute angles. The winding arrangement 12 includes three coils 26, wherein each coil 26 is arranged in one angle of said winding arrangement 12. In this embodiment, one of the three coils 26 is circular, while the other two coils 26 are triangular. The both triangular coils 26 have the same sizes and are constructed in the same way. The circular coil 26 is arranged in the right angle of the winding arrangement 12, while the triangular coils 26 are arranged in the acute angles of said winding arrangement 12.

The winding arrangement 12 includes two portions of high winding concentration 18 in the environment of the right angle. Each portion of high winding concentration 18 is formed between the circular coil 26 and one of the triangular coil 26 in each case. Further, the winding arrangement 12 includes three portions of low winding concentration 20. Two portions of low winding concentration 20 are formed in the environments of the both acute angles. The last portion of low winding concentration 20 is formed between the triangular coils 26. The distribution of the winding concentration depends on the shapes and positions of the coils 26 and on the angles of the winding arrangement 12.

The base plate 10 of FIG. 1 is congruent with the winding arrangement 12 of FIG. 3 within the induction coil. If the induction coil is a part of the induction cooking hob, then the base plate 10 of FIG. 1 is arranged above and covers the winding arrangement 12 of FIG. 3. Thereby, the conductive portion 14 of the base plate 10 covers the portion of high winding concentration 18 of the winding arrangement 12. In a similar way, the non-conductive portion 16 of the base plate 10 covers the portions of low winding concentration 20 of the winding arrangement 12.

The conductive portion 14 of the base plate 10 reacts locally to the magnetic field generated by the portion of high winding concentration 18 of the winding arrangement 12, so that the coupling between the magnetic field and matter being heated by said magnetic field is reduced. In contrast, the non-conductive portions 16 of the base plate 10 do not react to the magnetic field generated by the portion of low winding concentration 20 of the winding arrangement 12, so that the coupling between the magnetic field and the matter being heated by said magnetic field remains unchanged. This allows the uniform heat distribution. For example, the matter being heated by the magnetic field is the bottom of a cooking pot.

Figure 4:
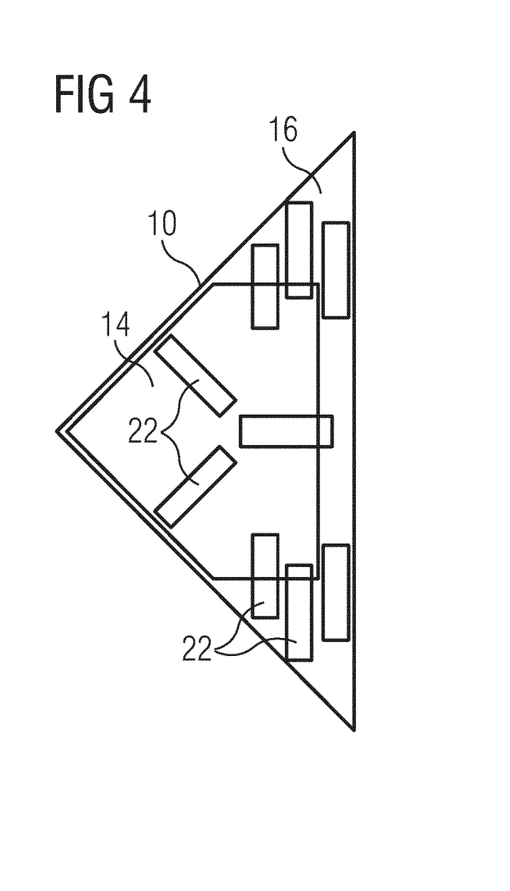
FIG. 4 illustrates a schematic top view of the base plate for the induction coil according to a second embodiment of the present invention.

FIG. 4 illustrates a schematic top view of the base plate 10 for the induction coil according to a second embodiment of the present invention.

The base plate 10 of the second embodiment is substantially the same as the base plate 10 shown in FIG. 1, but comprises additionally a number of ferrite elements 22. In this example, the base plate 10 comprises nine ferrite elements 22. The ferrite elements 22 are arranged above the base plate 10. The spatial density of the ferrite elements 22 above the conductive portion 14 of the base plate 10 is smaller than their spatial density above the non-conductive portions 16 of said base plate 10. The ferrite elements 22 are concentrated above the non-conductive portions 16 of the base plate 10. The ferrite elements 22 increase the coupling between the magnetic field and the matter being heated by said magnetic field.

Figure 5:
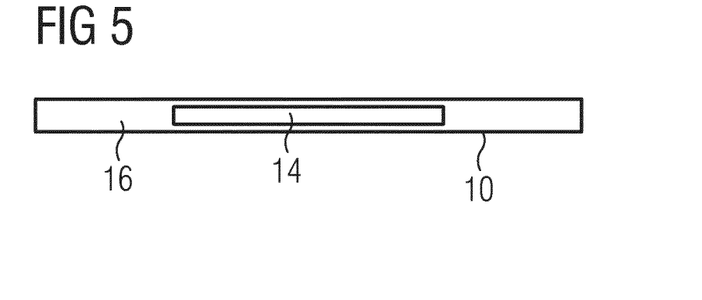
FIG. 5 illustrates a schematic sectional side view of the base plate for the induction coil according to a first example of the first embodiment of the present invention.

FIG. 5 illustrates a schematic sectional side view of the base 10 plate for the induction coil according to a first example of the first embodiment of the present invention. In this example, the conductive material is integrated inside a sheet made of dielectric material. The conductive material inside the dielectric material extends over the conductive portion 14 of the base plate 10. In the non-conductive portion 16 the sheet made of dielectric material does not contain any conductive material. For example, the dielectric material is mica, while the conductive material is litz wire inside the sheet made of mica. In this example, the layer thickness of the conductive material is marginally smaller than the layer thickness of the sheet made of dielectric material.

Figure 6:
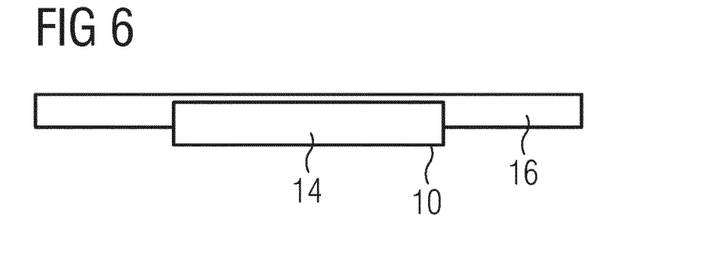
FIG. 6 illustrates a schematic sectional side view of the base plate for the induction coil according to a second example of the first embodiment of the present invention.

FIG. 6 illustrates a schematic sectional side view of the base plate 10 for the induction coil according to a second example of the first embodiment of the present invention. In this example, the conductive material is arranged inside and below the sheet made of dielectric material. The conductive material inside and below the dielectric material extends over the conductive portion 14 of the base plate 10, while the dielectric material in the non-conductive portion 16 of the base plate 10 does not contain any conductive material. In this example, the conductive material has about the double layer thickness as the sheet made of dielectric material.

Figure 7:
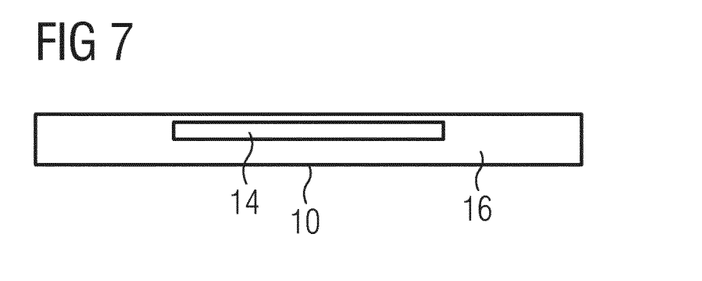
FIG. 7 illustrates a schematic sectional side view of the base plate for the induction coil according to a third example of the first embodiment of the present invention.

FIG. 7 illustrates a schematic sectional side view of the base plate 10 for the induction coil according to a third example of the first embodiment of the present invention. In this example, the conductive material is integrated inside an upper portion of the sheet made of dielectric material. The conductive material inside the dielectric material extends over the conductive portion 14 of the base plate 10. In the non-conductive portion 16 the sheet made of dielectric material does not contain any conductive material. In this example, the conductive material has about the half layer thickness as the sheet made of dielectric material.

Figure 8:
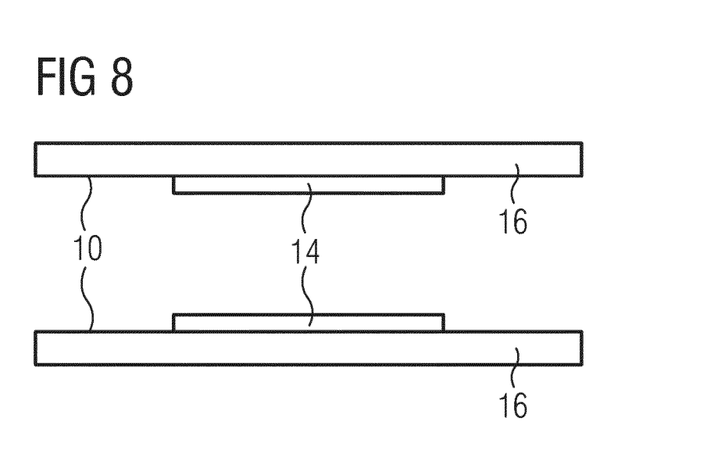
FIG. 8 illustrates a schematic sectional side view of a pair of base plates for the induction coil according to a third embodiment of the present invention.

FIG. 8 illustrates a schematic sectional side view of a pair of base plates 10 for the induction coil according to a third embodiment of the present invention. In the third embodiment the pair of base plates 10 is used instead of one single base plate. The base plates 10 have the same ground areas and are arranged on top of each other. The conductive material is attached at the bottom side of an upper base plate 10 and upon the top side of a lower base plate 10. The conductive material is arranged below the upper base plate 10 and upon the lower base plate 10. The conductive materials attached at the base plates 10 extend over the conductive portions 14 of said base plates 10, while the dielectric materials in the non-conductive portions 16 of the base plates 10 are not coated by any conductive material.

Figure 9:
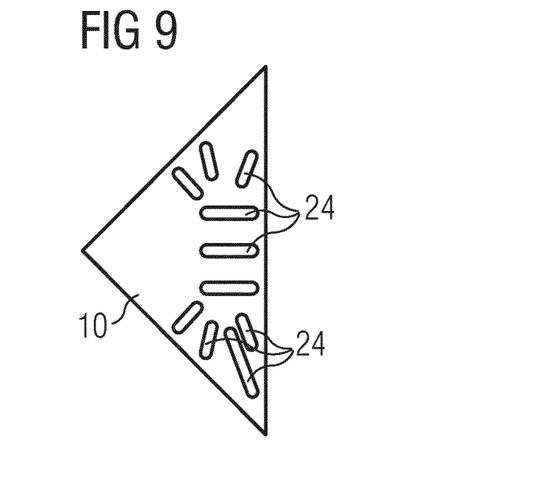
FIG. 9 illustrates a schematic top view of the base plate for the induction coil according to a fourth embodiment of the present invention.

FIG. 9 illustrates a schematic top view of the base plate 10 for the induction coil according to a fourth embodiment of the present invention. The base plate 10 has a triangular ground area. In particular, the base plate 10 is provided for covering the winding arrangements 12 shown in FIGS. 2 and 3.

The base plate 10 is made of one or more conductive materials, e.g. aluminium. The base plate 10 includes a plurality of slots 24. The slots 24 in the base plate of the fourth embodiment are arranged in a portion corresponding with the non-conductive portions 16 of the base plates 10 of the first and second embodiments. The portion of the base plate 10 of the fourth embodiment without slots 24 corresponds with the conductive portions 14 of the base plates 10 of the first and second embodiments. In contrast, the portion of the base plate 10 of the fourth embodiment with slots 24 corresponds with the non-conductive portions 16 of the base plates 10 of the first and second embodiments. The base plate 10 of the fourth embodiment includes the slots 24 instead the dielectric material the first and second embodiments.

The portion of the base plate 10 with slots 24 reacts locally to the magnetic field generated by the portion of high winding concentration 18 of the winding arrangement 12, so that the coupling between the magnetic field and matter being heated by said magnetic field is reduced. In contrast, the portion of the base plate 10 with the slots 24 do not or less react to the magnetic field generated by the portion of low winding concentration 20 of the winding arrangement 12, so that the coupling between the magnetic field and the matter being heated by said magnetic field remains unchanged. The arrangement of the slots 24 allows a uniform heat distribution.

Furthermore, the slots 24 may be combined with the non-conductive portions 16. Thus, the base plate 10 may include the non-conductive portions 16 made of dielectric material as well as the slots 24. The dielectric material and the slots 24 have similar effects in view of the magnetic field.

Figure 10:
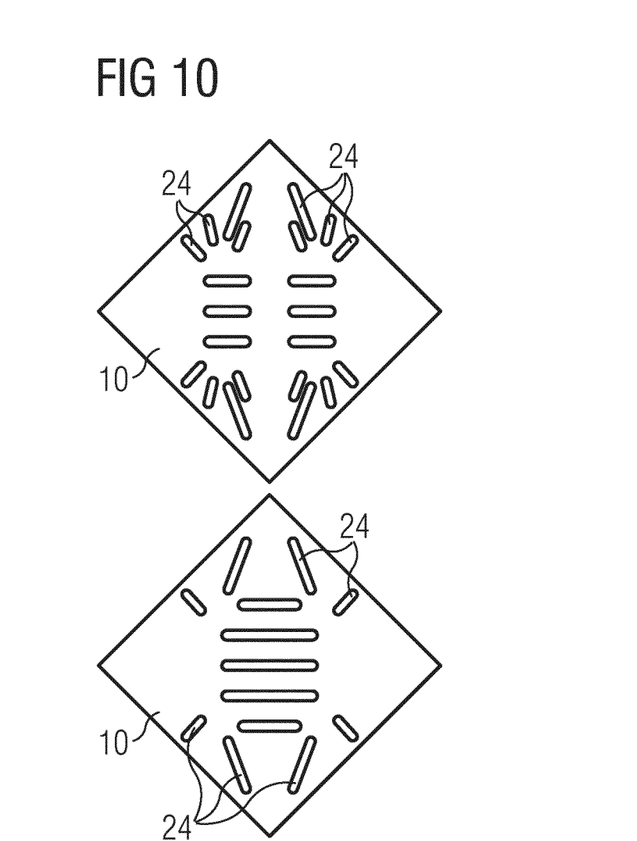
FIG. 10 illustrates a schematic top view of two base plates for the induction coil according to a fifth embodiment of the present invention.

FIG. 10 illustrates a schematic top view of two base plates 10 for the induction coil according to a fifth embodiment of the present invention. The both base plates 10 in FIG. 10 differ in the details of the geometric arrangements of the slots 24. However, the both base plates 10 in FIG. 10 cause substantially the same physical effect.

The base plates 10 in FIG. 10 have square shapes. Each square base plate 10 in FIG. 10 corresponds with two composite triangular base plates 10 of FIG. 9. In particular, each base plate 10 in FIG. 10 is provided for covering two triangular winding arrangements 12 shown in FIG. 2, wherein said winding arrangements 12 are arranged side-by-side, so that they form a square ground area.

Figure 11:
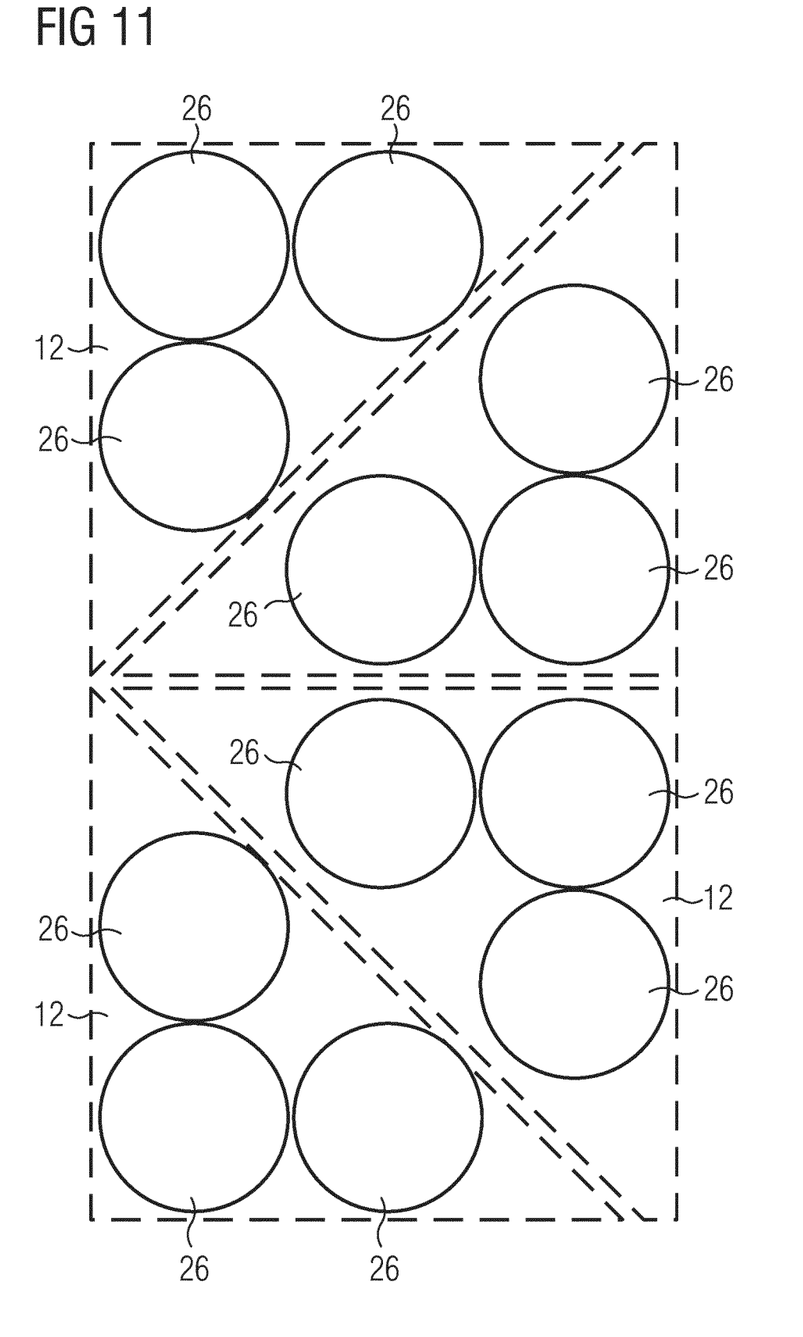
FIG. 11 illustrates a schematic top view of a formation of four winding arrangements according to the preferred embodiment of the present invention.

FIG. 11 illustrates a schematic top view of a formation of four winding arrangements 12 according to the preferred embodiment of the present invention. Two pairs of winding arrangements 12 are arranged in a row. Further, four or more such pairs of winding arrangements 12 may be arranged in a row or as a matrix. For example, four pairs of winding arrangements 12 may be arranged as a two-by-two matrix. Each pair of adjacent winding arrangements 12 form a square or rectangular ground area. The square base plates 10 of FIG. 10 are provided for covering the pair of winding arrangements 12 in each case and/or the triangular base plates 10 of FIGS. 1, 3, 4 and/or 9 are provided for covering a single winding arrangements 12 in each case.

Figure 12:
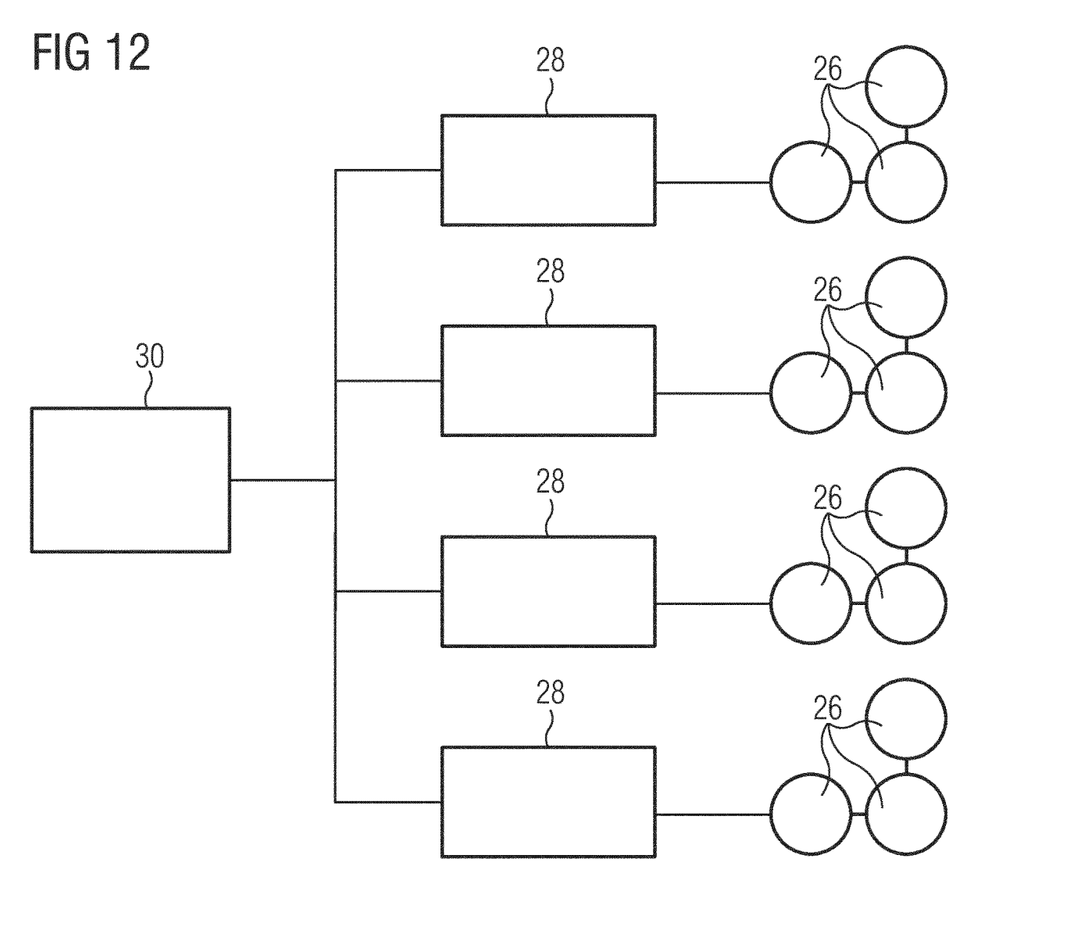
FIG. 12 illustrates a schematic circuit for the formation of the four winding arrangements according to the preferred embodiment of the present invention.

FIG. 12 illustrates a schematic circuit for the formation of the four winding arrangements 12. The circuit shown in FIG. 12 belongs to an induction heating appliance, in particular to an induction cooking hob.

The circuit comprises four winding arrangements 12, four induction generators 28 and a control unit 30. Each winding arrangement 12 includes three coils 26. The control unit 30 is provided for controlling the induction generators 28. Each induction generator 28 supplies the three coils 26 of one winding arrangement 12.

Although illustrative embodiments of the present invention have been described herein with reference to the accompanying drawing, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS

10 base plate
12 windings
14 conductive portion
16 non-conductive portion
18 portion of high winding concentration
20 portion of low winding concentration
22 ferrite element
24 slot
26 coil
28 induction generator
30 control unit

The invention claimed is:

1. An induction coil for an induction cooking hob, wherein:
    the induction coil comprises at least one base plate and at least one winding arrangement disposed below the base plate,
    the winding arrangement includes at least one portion of high winding concentration defined as an area below the base plate where at least two coils are adjacent each other, and at least one portion of low winding concentration defined as an area below the base plate that is free of a coil,
    the winding arrangement includes at least two coils,
    the base plate includes at least one conductive portion and at least one non-conductive portion,
    the at least one conductive portion of the base plate is arranged above the at least one portion of high winding concentration of the winding arrangement,
    at least a part of the at least one non-conductive portion of the base plate is arranged above the at least one portion of low winding concentration of the winding arrangement but not above the at least one portion of high winding concentration of the winding arrangement,
    the conductive portion of the base plate is made by at least one conductive material, and
    the non-conductive portion of the base plate is made by at least one non-conductive material and/or formed by at least one cut-out in the base plate.

2. The induction coil according to claim 1, wherein the base plate covers said winding arrangement or more adjacent winding arrangements.

3. The induction coil according to claim 1, wherein a ground area of the winding arrangement includes at least one acute angle.

4. The induction coil according to claim 1, wherein a ground area of the winding arrangement has a triangular shape including two or three acute angles.

5. The induction coil according to claim 4, wherein the ground area of the winding arrangement includes one right angle.

6. The induction coil according to claim 5, wherein the induction coil comprises at least one pair of winding arrangements including one right angle, and wherein said pair of winding arrangements comprises a square or rectangular ground area.

7. The induction coil according to claim 6, wherein the pair of winding arrangements is covered by one square or rectangular base plate.

8. The induction coil according to claim 6, wherein a plurality of pairs of winding arrangements are arranged in a row or as a matrix.

9. The induction coil according to claim 1, wherein the coils are circular, elliptic, triangular, square, and/or rectangular.

10. The induction coil according to claim 1, wherein the coils of one winding arrangement are identical, wherein the at least one high winding concentration and the at least one low winding concentration of the winding arrangement are formed by the positions of the coils.

11. The induction coil according to claim 1, wherein said two coils of one winding arrangement are different, wherein the at least one high winding concentration and the at least one low winding concentration of the winding arrangement are formed by the positions and the properties of the coils.

12. The induction coil according to claim 1, wherein the conductive material of the base plate includes metal.

13. The induction coil according to claim 12, wherein the conductive material of the base plate is aluminum.

14. The induction coil according to claim 1, wherein the non-conductive material of the base plate includes mica.

15. The induction coil according to claim 14, wherein the base plate is made of a mica sheet, and wherein the conductive portion of said base plate is formed by conductive windings made of litz wire and deposited on said mica sheet.

16. The induction coil according to claim 1, wherein the base plate is made of metal and the non-conductive portion is formed by a plurality of cut-outs in said base plate.

17. The induction coil according to claim 16, wherein the non-conductive portion is formed by a plurality of slots and/or holes.

18. The induction coil according to claim 1, wherein the base plate includes a plurality of ferrite elements, wherein a concentration of said ferrite elements in the non-conductive portion is higher than in the conductive portion.

19. An induction cooking hob comprising the least one induction coil according to claim 1.

20. The induction coil according to claim 1, the winding arrangement includes at least three coils.

\* \* \* \* \*